s011162573B2

United States Patent
Sung et al.

(10) Patent No.: US 11,162,573 B2
(45) Date of Patent: Nov. 2, 2021

(54) GEAR SYSTEM

(71) Applicant: LG Magna e-Powertrain Co., Ltd., Seoul (KR)

(72) Inventors: Changwoo Sung, Seoul (KR); Deokkyu Lee, Seoul (KR); Junggu Lee, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 0 days.

(21) Appl. No.: 16/932,926

(22) Filed: Jul. 20, 2020

(65) Prior Publication Data

US 2021/0215243 A1 Jul. 15, 2021

(30) Foreign Application Priority Data

Jan. 9, 2020 (KR) .................. 10-2020-0003314

(51) Int. Cl.
*F16H 45/02* (2006.01)
*F16H 57/04* (2010.01)
(Continued)

(52) U.S. Cl.
CPC ............. *F16H 57/043* (2013.01); *F16H 1/28* (2013.01); *F16H 57/0457* (2013.01);
(Continued)

(58) Field of Classification Search
CPC .... F16H 1/28; F16H 57/0479; F16H 57/0482; F16H 57/0484; F16H 57/0486; F16H 57/0457
See application file for complete search history.

(56) References Cited

U.S. PATENT DOCUMENTS 7,377,870 B2 * 5/2008 Matsushita ......... F16H 57/0482
475/159
7,967,713 B2 6/2011 Haupt et al.
(Continued)

FOREIGN PATENT DOCUMENTS

EP 3067588 A1 * 9/2016 ......... F16H 57/0482
EP 3067588 A1 9/2016
(Continued)

OTHER PUBLICATIONS

Communication and Search Report from the European Patent Office issued in Application No. 20193307.4-1012 dated Feb. 16, 2021 (10 pages).

*Primary Examiner* — Charles A Fox
*Assistant Examiner* — Farhana Pervin
(74) *Attorney, Agent, or Firm* — Finnegan, Henderson, Farabow, Garrett & Dunner, LLP (57) ABSTRACT

A gear system is provided to secure lubrication passages when the gear system is changed between driving, neutral, and parking modes. The gear system includes a planetary gear assembly, a hollow portion output shaft selectively engaged with a carrier such that the output shaft is configured to rotate with the carrier when the output shaft is engaged with the carrier. The gear system further includes a first lubrication passage formed radially at a first point on the carrier, a second lubrication passage formed radially at a second point on the output shaft, and a third lubrication passage formed between the outer surface of the output shaft and the inner surface of the carrier and configured to connect the first lubrication passage and the second lubrication passage.

14 Claims, 8 Drawing Sheets

(51) Int. Cl.
*F16H 1/28* (2006.01)
*F16H 57/08* (2006.01)

(52) U.S. Cl.
CPC ..... *F16H 57/0471* (2013.01); *F16H 57/0478* (2013.01); *F16H 57/0479* (2013.01); *F16H 57/0486* (2013.01); *F16H 57/082* (2013.01)

(56) References Cited

U.S. PATENT DOCUMENTS

| | | |
|---|---|---|
| 8,602,935 B2 | 12/2013 | Katoh et al. |
| 9,242,547 B2 * | 1/2016 | Dzafic ................. B60K 17/354 |
| 2003/0186771 A1 | 10/2003 | Tanikawa |
| 2012/0302391 A1 | 11/2012 | Duong et al. |
| 2016/0017982 A1 * | 1/2016 | Konruff ............. F16H 57/0479 |
| | | 475/159 |
| 2018/0080542 A1 * | 3/2018 | Sugiyama ................ B60K 6/40 |
| 2019/0178377 A1 * | 6/2019 | Terada ................ F16H 57/0446 |
| 2020/0215920 A1 * | 7/2020 | Suyama ................. H02K 7/116 |
| 2020/0332858 A1 * | 10/2020 | Dombek ............ F16H 57/0479 |

FOREIGN PATENT DOCUMENTS

| | | | |
|---|---|---|---|
| WO | WO 2019/074420 A1 | 4/2019 | |
| WO | WO-2019074420 A1 * | 4/2019 | ........... F16H 57/082 |

\* cited by examiner

GEAR SYSTEM

CROSS-REFERENCE TO RELATED APPLICATION

This application claims the benefit of Korean Patent Application No. 10-2020-0003314, filed on Jan. 9, 2020, in the Korean Intellectual Property Office, the disclosure of which is incorporated herein in its entirety by reference.

BACKGROUND

1. Field

This disclosure relates to a gear system having a lubrication structure.

2. Description of the Related Art

A motor is a power device that applies a current to rotate a rotor. The rotor rotates through an electromagnetic interaction with a stator. For this, a coil is wound on the stator and the rotor includes a permanent magnet (or vice versa). In response to the current being applied, a magnetic field may be formed around the coil. The magnetic field may lead to an electromagnetic interaction between the coil and the permanent magnet, so that a rotational force for driving mechanical load is assigned to the rotor.

The motor is used in various fields. Recently, with increasing necessity and demand for hybrid vehicles and electric vehicles, interests in motors required for the vehicles are also increasing.

In a case in which the motor is used in the vehicle as the power device, a gear system for transmitting the rotation of the rotor is required. The gear system has a lubrication structure to minimize heat generation, wear, and noise due to friction.

The vehicle generally requires a higher torque and a lower range of revolutions than a range of revolutions that the rotor has typically, so the gear system may be configured to perform a deceleration function. Such decelerating gear system may include, for example, a planetary gear-based gear system.

The planetary gear-based gear system may include a carrier that rotates in accordance with the revolution of a planetary gear and transmits power to an output shaft. Gears including the planetary gear may receive oil via a lubrication passage included in the carrier. The oil in the lubrication passage of the carrier is transmitted via a hollow portion of the output shaft.

An operation mode of the gear system may be changed to a driving mode, a neutral mode, and a parking mode. Due to this, whether the carrier and the output shaft mutually engage may be changed. Accordingly, there is a desire for a structure in which a lubrication passage of an output shaft is connected to a lubrication passage of a carrier to transmit the oil without interruption under any situation.

SUMMARY

An aspect provides a vehicle gear system using a planetary gear to solve the issue that lubrication is not smoothly performed when an operation mode is changed to a driving mode, a neutral mode, and a parking mode.

According to an aspect, there is provided a gear system including a sun gear configured to be rotatable by a motor, a ring gear configured disposed around a circumference of the sun gear, a planetary gear configured to engage the sun gear and the ring gear and to rotate and revolve around the sun gear and within the ring gear, a carrier coupled the planetary gear and being configured to be rotated by the revolving planetary gear, an output shaft comprising a hollow portion, the output shaft being selectively engaged with the carrier, such that the output shaft is configured to rotate in accordance with the rotation of the carrier when the output shaft is engaged with the carrier, the output shaft including a circumferential outer surface facing a inner surface of the carrier over a specific range in an axial direction, a first lubrication passage formed radially at a first point on the carrier within the specific range, a second lubrication passage formed radially at a second point on the output shaft within the specific range, and a third lubrication passage formed between the outer surface of the output shaft and the inner surface of the carrier and configured to connect the first lubrication passage and the second lubrication passage.

The third lubrication passage may extends circumferentially around the outer surface of the output shaft at an angle of 360 degrees (°).

The first lubrication passage may include three lubrication passages circumferentially spaced apart from each other at intervals of 120°. The second lubrication passage may include three lubrication passages circumferentially spaced apart from each other at intervals of 120°.

The third lubrication passage may extends along the circumferential boundary over an angle of at least 120°.

The first point may be coincident with the second point.

The hollow portion of the output shaft may be connected to the second lubrication passage. The second lubrication passage may extend radially from the hollow portion at the second point.

The gear system of claim 6, wherein oil is introduced into the hollow portion by gear churning.

The carrier may include a carrier plate provided at an end of the carrier disposed adjacent to the output shaft, the carrier plate being configured to cover a surface of the planetary gear disposed adjacent to the output shaft, and wherein the first point may be on at the carrier plate.

The carrier may further include an inlet passage that axially extends from a radially outer end portion of the first lubrication passage to guide oil into an inner space of the carrier in which the planetary gear is located.

The second point may be positioned at an end of the output shaft facing the carrier.

The hollow portion further comprises oil branch points allows oil to flow into a needle roller bearing, a synchronizer, and a ball bearing. The branch points are sequentially arranged along the output shaft in a direction from the second point to an oil inlet.

An axial width of the third lubrication passage may be greater than an axial width of the first lubrication passage and an axial width of the second lubrication passage.

A longitudinal cross-sectional area of the third lubrication passage may be greater than a cross-sectional area of the first lubrication passage and a cross-sectional area of the second lubrication passage.

The gear system may further include a rotor configured to rotate the sun gear. When the gear system is in a driving mode, the carrier is engaged with the output shaft. When the gear system is in at least one of a neutral mode or a parking mode, the carrier is not engaged with the output shaft.

BRIEF DESCRIPTION OF THE DRAWINGS

The above and other aspects, features, and advantages of certain embodiments will be more apparent from the following detailed description taken in conjunction with the accompanying drawings, in which:

FIGS. 1A through 3B illustrate perspective views and longitudinal sections of a gear system operating in three modes according to at least one example embodiment of the present disclosure;

DETAILED DESCRIPTION

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1A:
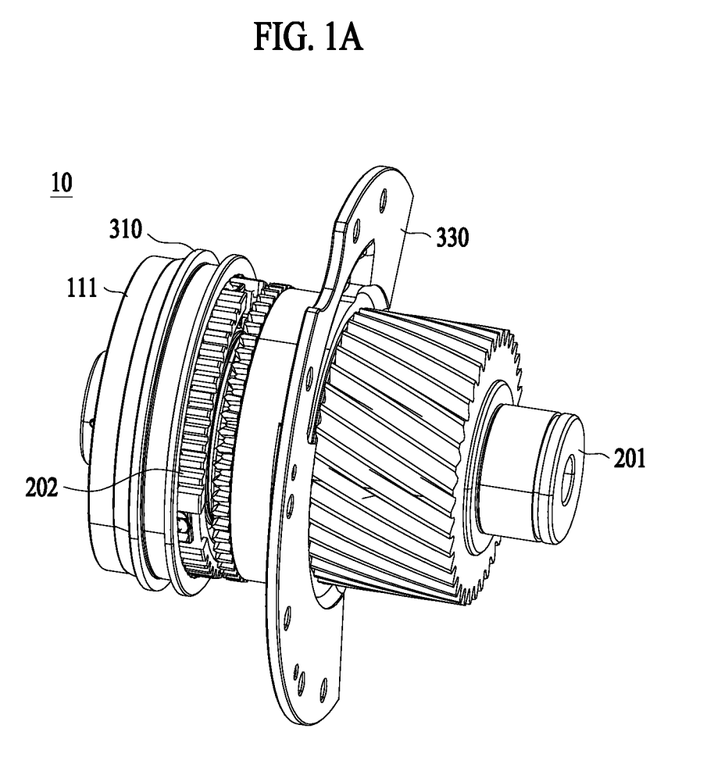
Figure 2A:
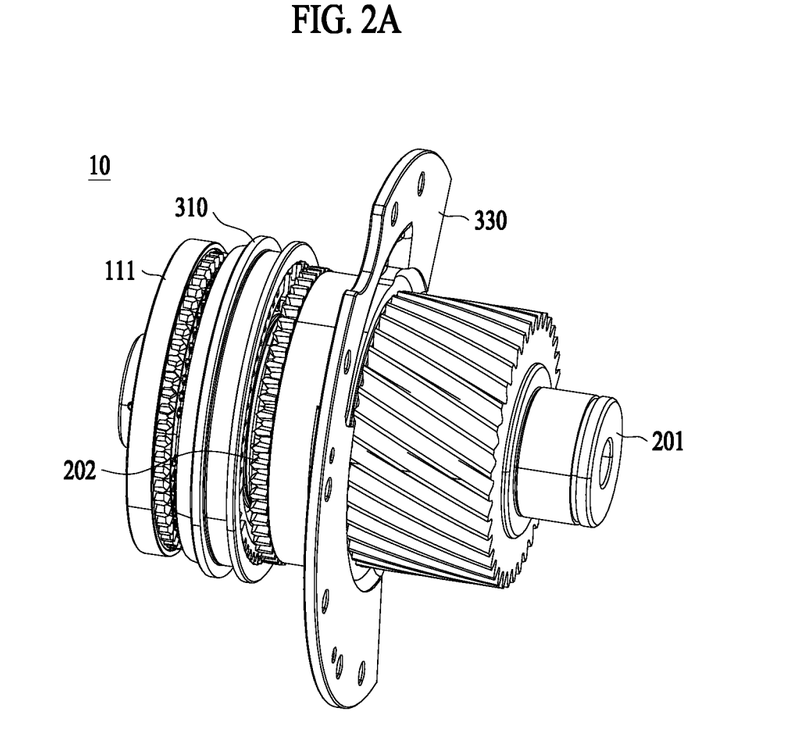
Figure 2B:
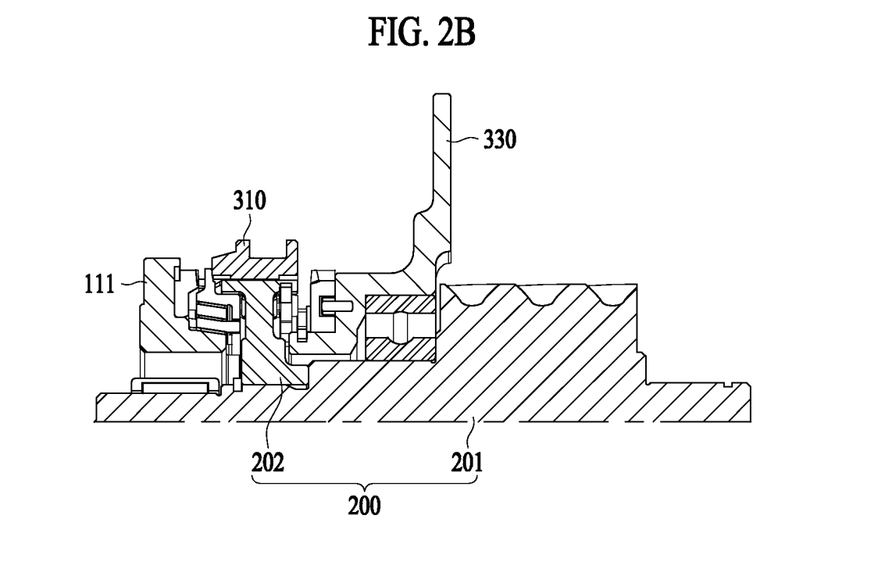
Figure 3A:
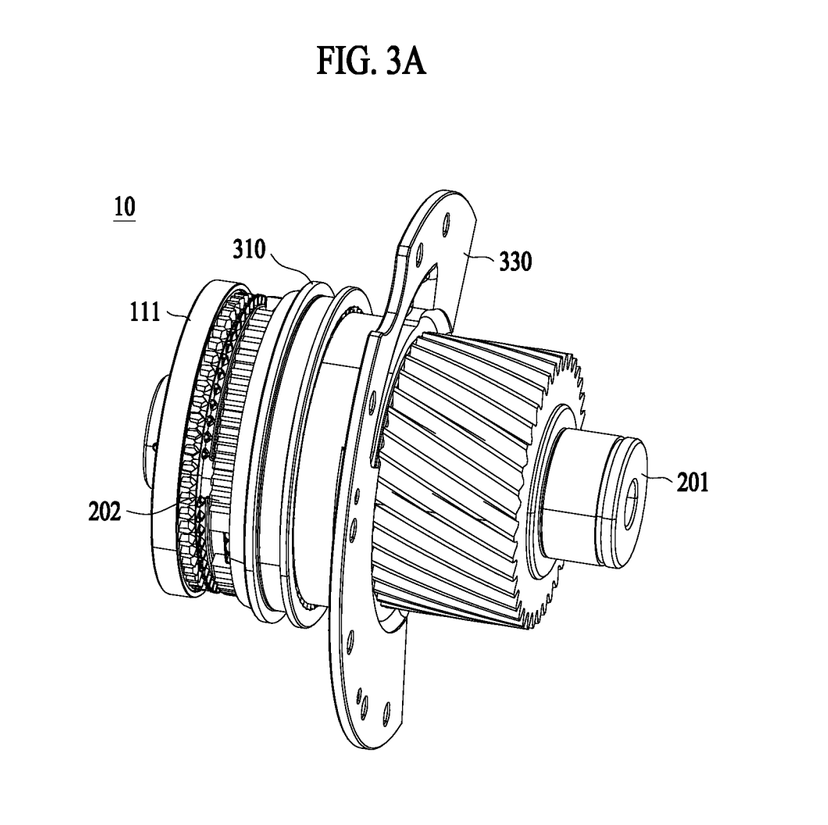
Figure 3B:
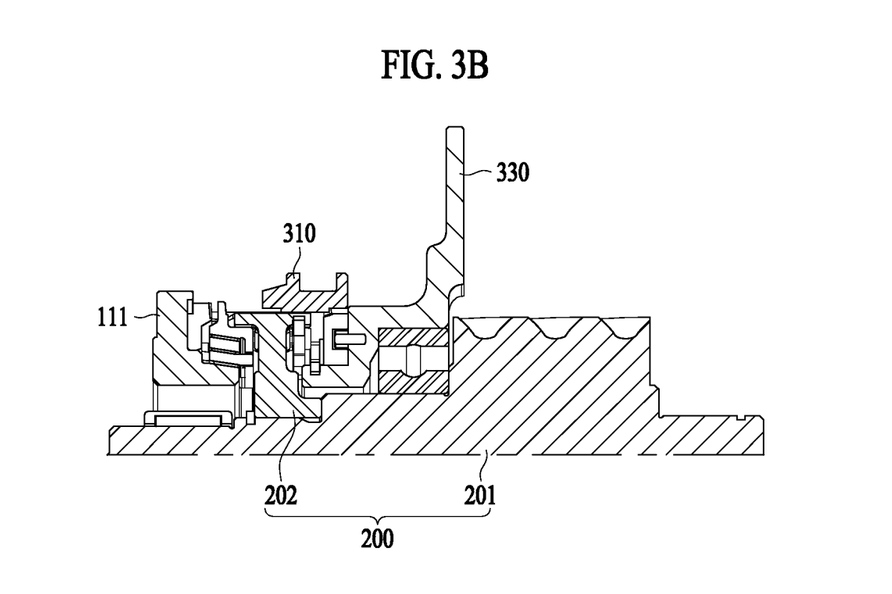
Figure 4:
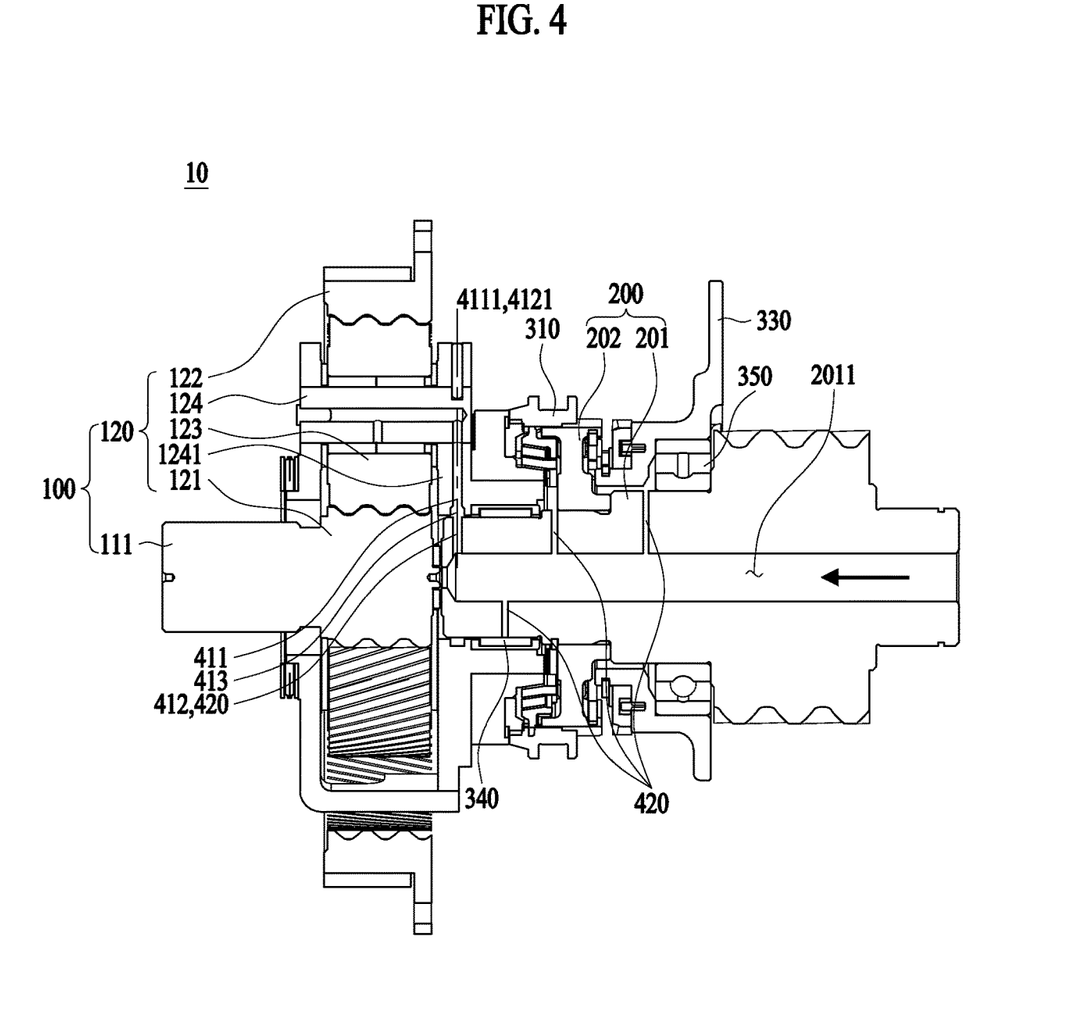
FIG. 4 is a transverse sectional view of FIG. 1A.
Figure 5:
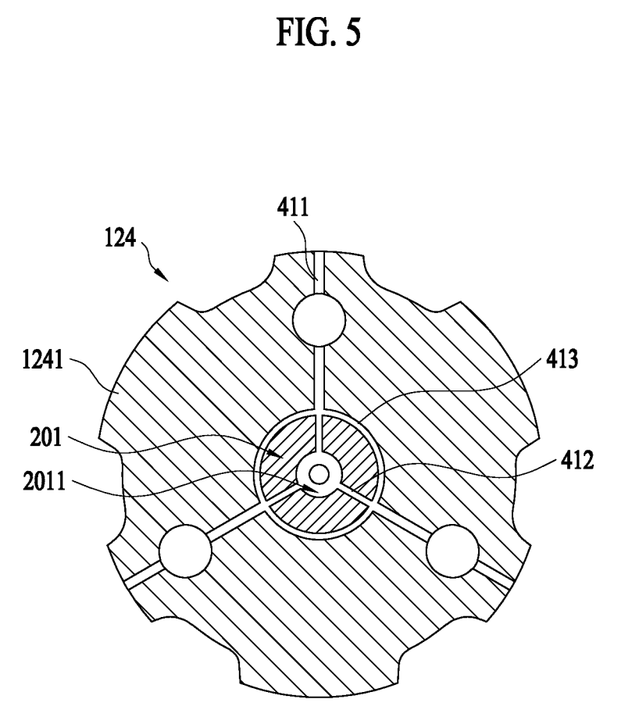
FIGS. 5 and 6 illustrate two states of a transverse section of a gear system including a carrier plate according to at least one example embodiment of the present disclosure.
Figure 6:
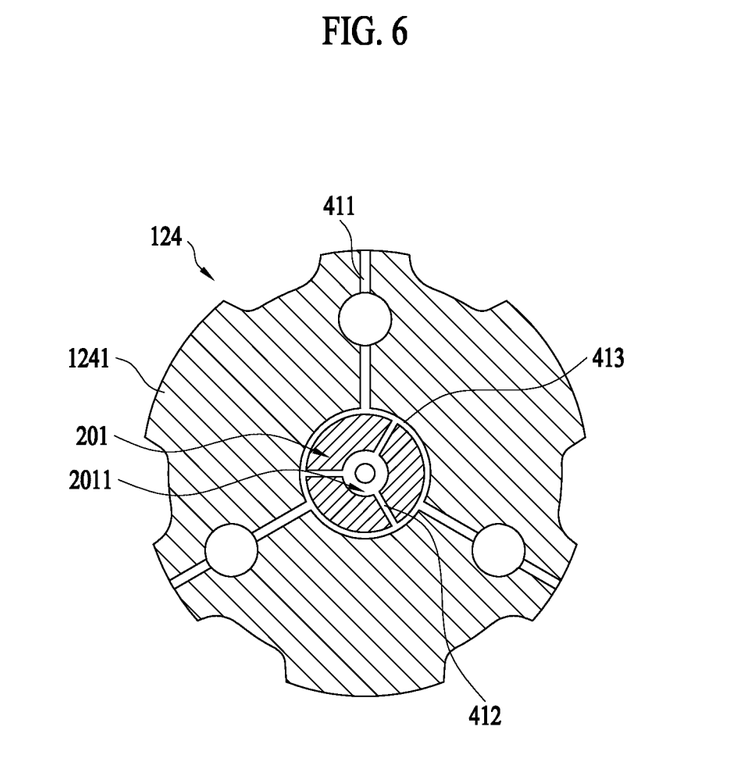

FIGS. 1A through 3B illustrate perspective views and longitudinal sections of a gear system 10 operating in three modes according to at least one example embodiment of the present disclosure, FIG. 4 is a transverse sectional view of FIG. 1A, and FIGS. 5 and 6 illustrate two states of a transverse section of the gear system 10 including a carrier plate 1241 according to at least one example embodiment of the present disclosure.

Figure 1B:
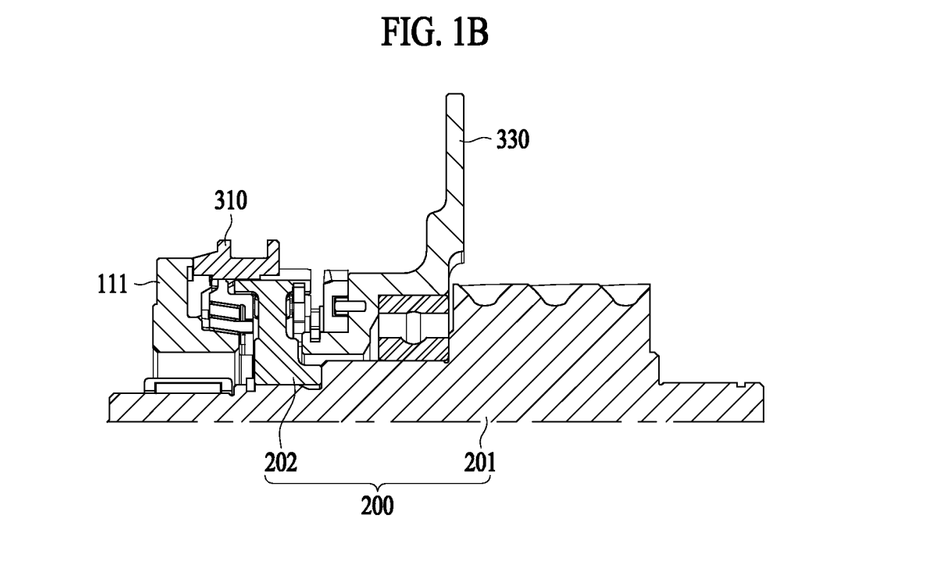

In a case in which power for vehicle is implemented by a motor, the motor may transmit the power to an output shaft 201. For deceleration of the motor, a decelerating gear may be provided between the motor and the output shaft 201. The decelerating gear may be, for example, a planetary gear 123. The planetary gear 123 may be disposed between an input shaft 111 and the output shaft 201 and thus, advantageous for space utilization.

The gear system 10 of the present disclosure is described based on, but not limited to, an example in which the power of the motor is transmitted to the output shaft 201 through the planetary gear 123 and may include all cases to which the technical characteristics of the present disclosure apply.

A configuration including the motor, the output shaft 201, and a planetary gear assembly 120 is defined as the gear system 10.

A motor is a power element that applies a current to rotate a rotor. The rotor may rotate through an electromagnetic interaction with a stator. The stator may be provided with a coil wound therearound and the rotor may include a permanent magnet, or vice versa. In response to the current being applied, a magnetic field may be formed around the coil, which may lead to an interaction with the permanent magnet.

The output shaft 201 may be a final stage element that receives the power from the motor in the gear system 10. The output shaft 201 may be connected to wheels of a vehicle to be involved in driving the wheels.

The planetary gear assembly 120 may serve as a medium for transmitting the power of the motor to the output shaft 201. The planetary gear assembly 120 includes a sun gear 121, a ring gear 122, the planetary gear 123, and a carrier 124. The sun gear 121 directly rotates by motor rotation. The sun gear 121 and the rotor may be integrally formed by the input shaft 111 or may be formed separately and press-fitted to be driven integrally. The ring gear 122 may be disposed around a circumference of the sun gear 121 and fixed not to rotate on the gear system 10. The planetary gear 123 may engage the sun gear 121 and the ring gear 122 to rotate and revolve by rotation of the sun gear 121 and the fixed ring gear 122. The planetary gear 123 may revolve around the sun gear 121 and within the ring gear 122. The carrier 124 may be coupled with the planetary gear 123 to be rotated by the revolving of the planetary gear 123 and transmit the power to the output shaft 201.

The output shaft 201 may be selectively engaged with the carrier 124 by a synchronizer 310 (or sleeve). When engaged with the carrier 124, the output shaft 201 may rotate in accordance with the rotation of the carrier 124. Specifically, an output part 200 may include the output shaft 201 and a hub 202 that couples to the output shaft 201 to be engaged with the synchronizer 310. The hub 202 and the output shaft 201 may be formed integrally, and also be formed separately and coupled through press-fitting.

The gear system 10 may implement three modes, that is, a driving mode, a neutral mode, and a parking mode. Each of the modes may be changed based on an engagement state or a connection state of the synchronizer 310.

As illustrated in FIGS. 1A and 1B, when the synchronizer 310 fixedly connects an input part 100 and the output part 200, a driving force may be transmitted to the output part 200 in response to the motor connected to the input part 100 being driven. In this case, the gear system 10 may be in the driving mode.

As illustrated in FIGS. 2A and 2B, when the synchronizer 310 is connected to the output part 200, the driving force of the motor may not be transmitted to the output part 200. A torque transmitted from an external force to the wheels may rotate the output part 200. In this case, the gear system 10 may be in the neutral mode.

As illustrated in FIGS. 3A and 3B, when the synchronizer 310 is attached to the output part 200 and a housing 320 that is non-rotatably fixed to the vehicle or a parking disk 330 that is fixed to the housing 320, the driving force of the motor may not be transmitted to the output part 200. Also, even a rotational force transmitted from the external force through the wheels may not rotate the output part 200, so that the wheels may not rotate. In this case, the gear system 10 may be in the parking mode.

A lubrication structure may be embodied in the gear system 10 to reduce friction. The reduction in friction may reduce wear on members, reduce vehicle noise, and minimize a loss of power.

In general, oil may be used for lubrication in the vehicle. The oil may reduce friction while circulating or staying in a lubrication path that requires lubrication.

The lubrication may also be applied to the planetary gear assembly 120. The present disclosure proposes a method to smoothly supply the oil to the planetary gear assembly 120.

The oil may flow into the planetary gear assembly 120 through a hollow portion 2011 of the output shaft 201. An oil supply may be based on gear churning or pumping.

A lubrication passage from the output shaft 201 to the planetary gear assembly 120 may be implemented by connecting a lubrication passage of the output part 200 and a lubrication passage of the input part 100 at a point at which the output part 200 overlaps the input part 100 on a center axis. Since an operation mode of the gear system 10 is frequently changed to the aforementioned three modes, a relative rotational angle between the output part 200 and the input part 100 may not be constant. Thus, a maintenance of the connection between the lubrication passage of the input part 100 and the lubrication passage of the output part 200 may not be ensured.

Accordingly, the present disclosure proposes a third lubrication passage 413 to maintain the connection between the lubrication passage of the input part 100 and the lubrication passage of the output part 200.

The lubrication passage of the input part 100 may include a first lubrication passage 411 formed in a radial direction. The lubrication passage of the output part 200 may include a second lubrication passage 412 formed in the radial direction. The first lubrication passage 411 may be provided in the carrier 124. The second lubrication passage 412 may be provided in the output shaft 201. The output shaft 201 forms an area facing the carrier 124 along an outer circumference of the output shaft 201 based on a specific range in an axial direction. The output shaft 201 including a circumferential outer surface facing an inner surface of the carrier 124 over a specific range in an axial direction. The first lubrication passage 411 may be provided at a first point 4111 on the carrier 124 within the specific range in the axial direction and the second lubrication passage 412 may be provided at a second point 4121 on the output shaft 201 within the specific range in the axial direction.

The third lubrication passage 413 may be formed between the outer surface of the output shaft 201 and the inner surface of the carrier 124 and the output shaft 201 to connect the first lubrication passage 411 and the second lubrication passage 412. The third lubrication passage 413 may connect an output-shaft-side end portion of the first lubrication passage 411 and a carrier-side end portion of the second lubrication passage 412.

Unlike the first lubrication passage 411 and the second lubrication passage 412 formed in the radial direction, the third lubrication passage 413 may be formed in a circumferential direction, so that the first lubrication passage 411 and the second lubrication passage 412 are always in connection irrespective of a degree of relative rotation between the carrier 124 and the output shaft 201 or a state of the relative rotation. When the oil is introduced, the oil in the second lubrication passage 412 may flow into the first lubrication passage 411 irrespective of the state of the rotation between the output shaft 201 and the carrier 124.

Based on a transverse section, the first lubrication passage 411 and the second lubrication passage 412 may each include three lubrication passages circumferentially spaced apart from each other at intervals of 120 degrees (°) and include a straight-line shape formed in the radial direction. A straight lubrication passage may minimize a resistance of the oil flowing into the planetary gear assembly 120. Desirably, the first lubrication passage 411 may be formed to have a width greater than or equal to that of the second lubrication passage 412 to prevent an occurrence of an oil bottleneck phenomenon.

The first lubrication passage 411 or the second lubrication passage 412 may be implemented to have a curved or bent shape instead of the straight-line shape in consideration of rotational inertia and the like.

Also, desirably, the third lubrication passage 413 may be implemented to have a width that is sufficiently large to prevent the oil bottleneck phenomenon and greater than or equal to the width of the second lubrication passage 412. Since the third lubrication passage 413 functions as a chamber through which the oil flows toward the first lubrication passage 411, it is advantageous to secure a space as large as possible. In view of this, a transverse-sectional width of the third lubrication passage 413 may be greater than the width of the first lubrication passage 411.

Likewise, a longitudinal-sectional width of the third lubrication passage 413 may have the same characteristic as the transverse-sectional width of the third lubrication passage 413. In other words, an axial width of the third lubrication passage 413 may be greater than an axial width of the first lubrication passage 411 and an axial width of the second lubrication passage 412. As such, a longitudinal-sectional area of the third lubrication passage 413 may be greater than a cross-sectional area of the first lubrication passage 411 and a cross-sectional area of the second lubrication passage 412.

Figure 7:
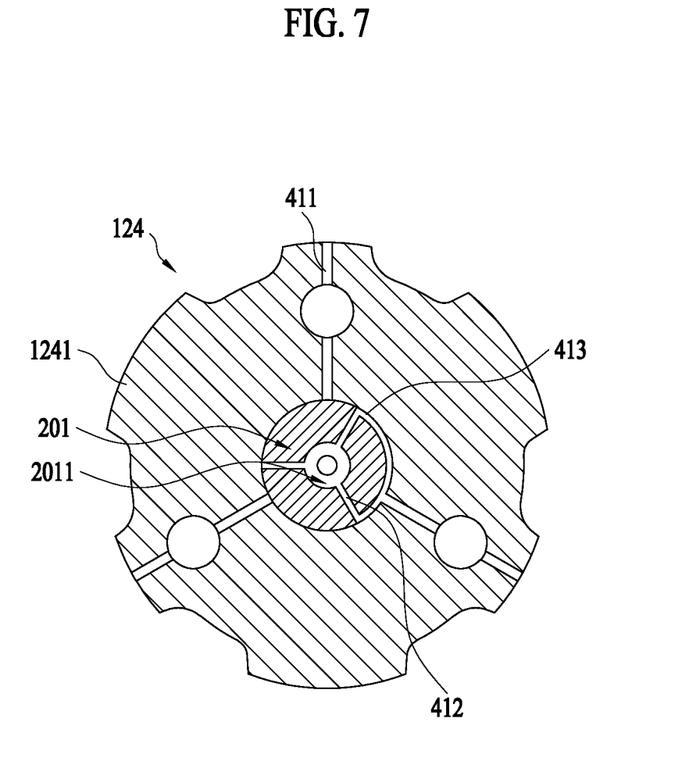
FIG. 7 illustrates a transverse section of a gear system according to at least one example embodiment of the present disclosure.

FIG. 7 illustrates a transverse section of the gear system 10 according to at least one example embodiment of the present disclosure.

When each of the first lubrication passage 411 and the second lubrication passage 412 is formed as a plurality of passages spaced at intervals of 120°, the third lubrication passage 413 may extend along the circumferential boundary over an angle of at least 120°. In the above structure, irrespective of a relative angle between the carrier 124 and the output shaft 201, at least one passage of the first lubrication passage 411 and at least one passage of the second lubrication passage 412 may communicate to perform a lubrication function.

Generalizing this, an angular range of the third lubrication passage 413 may have at least a greater angle among wider spaces among angles between two adjacent passages of the first lubrication passages 411 and angles between two adjacent passages of the second lubrication passages 412.

The third lubrication passage 413 may be formed along the circumferential boundary at 360°. The third lubrication passage 413 may extend circumferentially around the outer surface of the output shaft 201 at an angle of 360°. In this case, irrespective of the relative angle between the carrier 124 and the output shaft 201, all passages of the first lubrication passage 411 may communicate with all passages of the second lubrication passage 412.

In a case in which the third lubrication passage 413 is formed with respect to a partial angle of 360°, a stable lubrication passage using a minimum oil space may be implemented. In a case in which the third lubrication passage 413 is formed at 360°, all lubrication passages may always communicate with one another whereby a lubrication reliability is ensured and an occurrence of oil bottleneck phenomenon is reduced.

Figure 8:
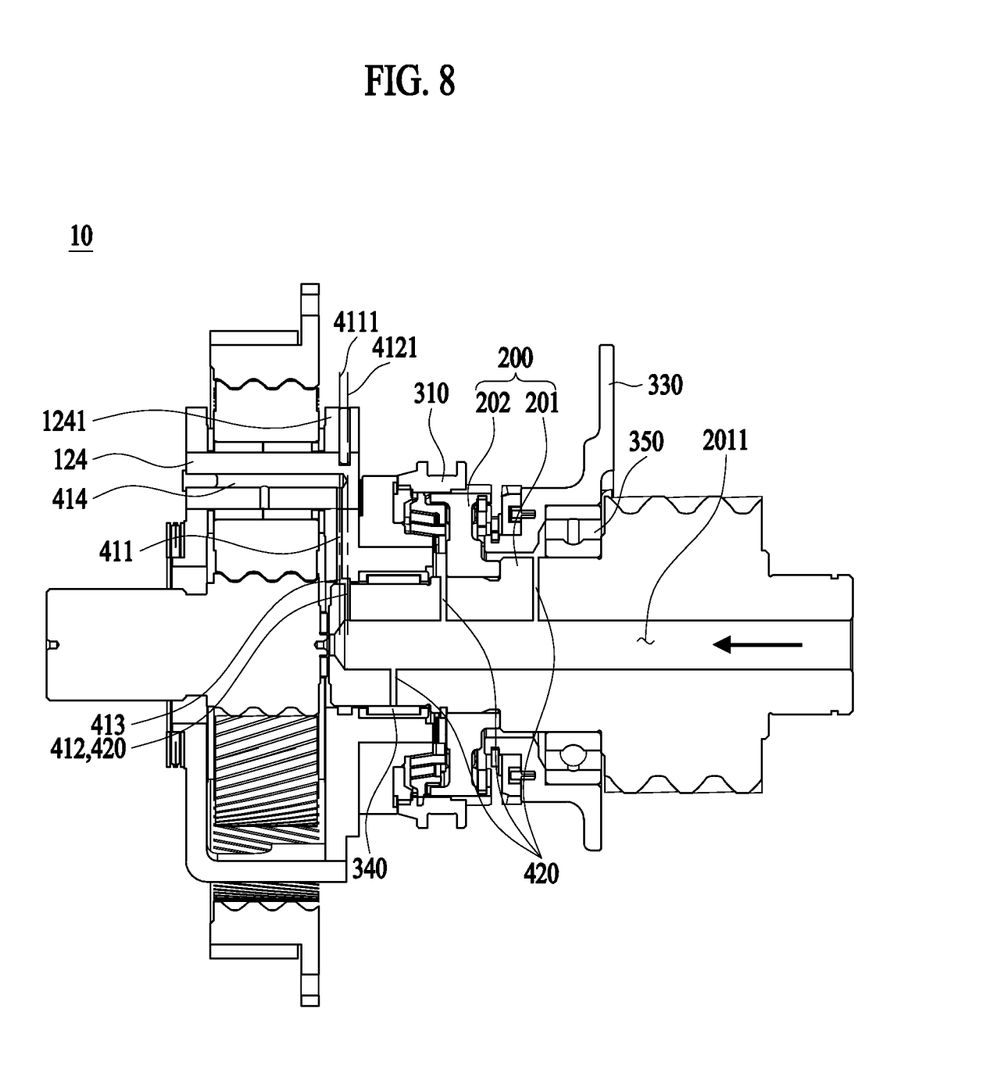
FIG. 8 illustrates a longitudinal section of a gear system according to at least one example embodiment of the present disclosure.

FIG. 8 illustrates a longitudinal section of the gear system 10 according to at least one example embodiment of the present disclosure.

Provision of the third lubrication passage 413 may increase degrees of freedom in designing the first lubrication passage 411 and the second lubrication passage 412 with respect to the axial direction. When the third lubrication passage 413 is absent and the first lubrication passage 411 and the second lubrication passage 412 are implemented to be holes, the first lubrication passage 411 and the second lubrication passage 412 may be arranged at one point in the axial direction. When the third lubrication passage 413 is present, the third lubrication passage 413 may connect the first lubrication passage 411 and the second lubrication passage 412 with respect to the axial direction, so that the arrangement of the first lubrication passage 411 and the second lubrication passage 412 is relatively free.

Due to the provision of the third lubrication passage 413, the first point 4111 at which the first lubrication passage 411 is located in the axial direction may be different from the second point 4121 at which the second lubrication passage 412 is located in the axial direction. The third lubrication passage 413 may be formed to correspond to a distance from the first point 4111 to the second point 4121 or more in the axial direction.

To minimize a resistance of oil flowing from the second lubrication passage 412 into the first lubrication passage 411, it is desirable that the first point 4111 is coincident with the second point 4121.

The first point 4111 may be provided at an output-shaft-side end portion of the carrier 124. The second point 4121 may be provided at a carrier-side end portion of the output shaft 201. The second point 4121 is positioned at an end of the output shaft 201 facing the carrier 124. The first point 4111 may be included in the carrier plate 1241 of the carrier 124. The carrier plate 1241 may cover an output-shaft-side surface of the planetary gear 123. The carrier plate 1241 provided at an end of the carrier 124 disposed adjacent to the output shaft 201, the carrier plate 1241 being configured to cover a surface of the planetary gear 123 disposed adjacent to the output shaft 201.

The first lubrication passage 411 may be connected to an inlet passage 414 so that the oil flows into a space including the planetary gear 123 via the inlet passage 414. The inlet passage 414 may be formed to axially extend from a radially outer end portion of the first lubrication passage 411.

The output shaft 201 in which the oil is introduced may include the hollow portion 2011 for the inflow of the oil. The output shaft 201 and the hollow portion 2011 may be concentric. As described above, the oil may be introduced into the hollow portion 2011 by the gear churning.

The oil introduced into the hollow 2011 may diverge at oil branch points 420 to flow into a ball bearing 350, the synchronizer 310, and a needle roller bearing 340 in a direction to the second point 4121, in sequence. The ball bearing 350 may refer to a ball-type bearing located between the housing 320 and the output shaft 201. The needle roller bearing 340 may refer to a bearing located between the carrier 124 and the output shaft 201, more specifically, the hub 202 fixed to the output shaft 201.

According to at least one example embodiment, it is possible to smoothly lubricate a gear system while an operation mode is continuously changed to a driving mode, a neutral mode, and a parking mode.

Further, according to at least one example embodiment, it is possible to easily introduce a lubricant oil into an assembly.

Further, according to at least one example embodiment, it is possible to increase degrees of freedom in design since a lubrication function is performed even when a carrier lubrication passage and an output-shaft lubrication passage of a planetary gear assembly are located in different positions.

Additional ranges of possibilities will become apparent from the following detailed description. It should be understood, however, that the detailed description and specific examples, such as the preferred embodiments of the present disclosure, are given by way of illustration only, since various changes and modifications within the spirit and scope of the present disclosure will be apparent to those skilled in the art.

It is apparent to those skilled in the art that the present disclosure may be materialized in other specific forms without departing from the essential characteristics of the present disclosure.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A gear system comprising:
 a sun gear configured to be rotatable by a motor;
 a ring gear disposed around a circumference of the sun gear;
 a planetary gear configured to engage the sun gear and the ring gear and to rotate and revolve around the sun gear and within the ring gear;
 a carrier coupled to the planetary gear and being configured to be rotated by the revolving planetary gear;
 an output shaft comprising a hollow portion, the output shaft being selectively engaged with the carrier such that the output shaft is configured to rotate in accordance with the rotation of the carrier when the output shaft is engaged with the carrier, the output shaft including a circumferential outer surface facing an inner surface of the carrier over a specific range in an axial direction;
 a first lubrication passage formed radially at a first point on the carrier within the specific range;
 a second lubrication passage formed radially at a second point on the output shaft within the specific range; and
 a third lubrication passage defined by a space between the outer surface of the output shaft and the inner surface of the carrier and configured to connect the first lubrication passage and the second lubrication passage;

wherein the third lubrication passage extends circumferentially around the outer surface of the output shaft over an angle of 360°, and wherein the first point is coincident with the second point in the axial direction.

2. The gear system of claim 1, wherein:
the first lubrication passage comprises three lubrication passages circumferentially spaced apart from each other at intervals of 120°, and
the second lubrication passage comprises three lubrication passages circumferentially spaced apart from each other at intervals of 120°.

3. The gear system of claim 2, wherein the third lubrication passage extends along the circumferential boundary over an angle of at least 120°.

4. The gear system of claim 1, wherein:
the hollow portion of the output shaft is connected to the second lubrication passage, and
the second lubrication passage extends radially from the hollow portion at the second point.

5. The gear system of claim 4, wherein oil is introduced into the hollow portion by gear churning.

6. The gear system of claim 1, wherein the carrier comprises a carrier plate provided at an end of the carrier disposed adjacent to the output shaft, the carrier plate being configured to cover a surface of the planetary gear disposed adjacent to the output shaft, and wherein the first point is on the carrier plate.

7. The gear system of claim 6, wherein the carrier further comprises an inlet passage that axially extends from a radially outer end portion of the first lubrication passage to guide oil into an inner space of the carrier in which the planetary gear is located.

8. The gear system of claim 1, wherein the second point is positioned at an end of the output shaft facing the carrier.

9. The gear system of claim 8, wherein the hollow portion further comprises oil branch points configured to allow oil to flow into a needle roller bearing, a synchronizer, and a ball bearing, the branch points being sequentially arranged along the output shaft in a direction from the second point to an oil inlet.

10. The gear system of claim 1, wherein an axial width of the third lubrication passage is greater than an axial width of the first lubrication passage and an axial width of the second lubrication passage.

11. The gear system of claim 1, wherein a cross-sectional area of the third lubrication passage is greater than a cross-sectional area of the first lubrication passage and a cross-sectional area of the second lubrication passage.

12. The gear system of claim 1, further comprising:
a rotor configured to rotate the sun gear, wherein:
when the gear system is in a driving mode, the carrier is engaged with the output shaft, and
when the gear system is in at least one of a neutral mode or a parking mode, the carrier in not engaged with the output shaft.

13. A gear system comprising:
a sun gear configured to be rotatable by a motor;
a ring gear disposed around a circumference of the sun gear;
a planetary gear configured to engage the sun gear and the ring gear and to rotate and revolve around the sun gear and within the ring gear;
a carrier coupled to the planetary gear and being configured to be rotated by the revolving planetary gear;
an output shaft comprising a hollow portion, the output shaft being selectively engaged with the carrier such that the output shaft is configured to rotate in accordance with the rotation of the carrier when the output shaft is engaged with the carrier, the output shaft including a circumferential outer surface facing an inner surface of the carrier over a specific range in an axial direction;
a first lubrication passage formed radially at a first point on the carrier within the specific range;
a second lubrication passage formed radially at a second point on the output shaft within the specific range; and
a third lubrication passage formed between the outer surface of the output shaft and the inner surface of the carrier and configured to connect the first lubrication passage and the second lubrication passage,
wherein the second point is positioned at an end of the output shaft facing the carrier.

14. The gear system of claim 13, wherein the hollow portion further comprises oil branch points configured to allow oil to flow into a needle roller bearing, a synchronizer, and a ball bearing, the branch points being sequentially arranged along the output shaft in a direction from the second point to an oil inlet.

* * * * *